United States Patent Office 3,679,580
Patented July 25, 1972

3,679,580
PROCESS FOR THE DE-IONIZATION OF AQUEOUS SALINE SOLUTIONS
Gianfranco Boari, Lorenzo Liberti, Carlo Merli, and Roberto Passino, Rome, Italy, assignors to Consiglio Nazionale Delle Ricarche, Rome, Italy
Filed July 13, 1970, Ser. No. 54,256
Claims priority, application Italy, July 12, 1969, 38,643/69
Int. Cl. B01d 15/04
U.S. Cl. 210—26
3 Claims

ABSTRACT OF THE DISCLOSURE

A process for the de-ionization of aqueous saline solutions by means of ion exchange treatment is disclosed, the process being characterized by the fact that the process is carried out by using a cation exchanger, an anion exchanger and a cation exchanger arranged in series, and wherein the first cation exchanger is constituted of essentially weak cation exchange resins and the anion exchanger is constituted of weak anion exchange resins, the process comprising the steps of: passing the aqueous solution to be de-ionized through the first cation exchanger, then through the anion exchanger and at last through the second cation exchanger; recycling a part of the solution effluent from the anion exchanger upstream of the first cation exchanger and controlling the recycle in order to obtain a methyl orange alkalinity in the solution feeding the first cation exchanger, and if necessary, decarbonating the solution effluent from the last cation exchanger and recycling the recovered $CO_2$ upstream of the anion exchanger.

---

The present invention relates to a process for partial or total de-ionization of aqueous saline solutions by means of cation exchangers, weakly acid, and anion exchangers, weakly basic.

Processes for the de-ionization of aqueous solutions by means of strong cation exchangers and weak anion exchangers are already known in the art.

These processes have however some inconveniences, the most important of which is that of requiring a considerable amount of regenerating media to regenerate the exhausted ion exchange resins.

Further the process efficiency is adversely affected by the considerable loss of the exchange capacity due to the rinsing which is necessary after the regeneration, in the cases, wherein the content of solids in ionic form in the solution to be treated is very high.

When using back de-ionizing processes of known type where weak anion and weak cation exchangers are provided, considerable difficulties arise in the case where aqueous saline solutions have to be treated which contain salts of alkaline and alkaline-earth metals as well as iron salts.

Therefore the main object of the present invention is a process for the de-ionization of aqueous saline solutions by means of cation and anion exchangers of a substantial weak type which overcomes the foregoing inconveniences and disadvantages.

Figure 1:
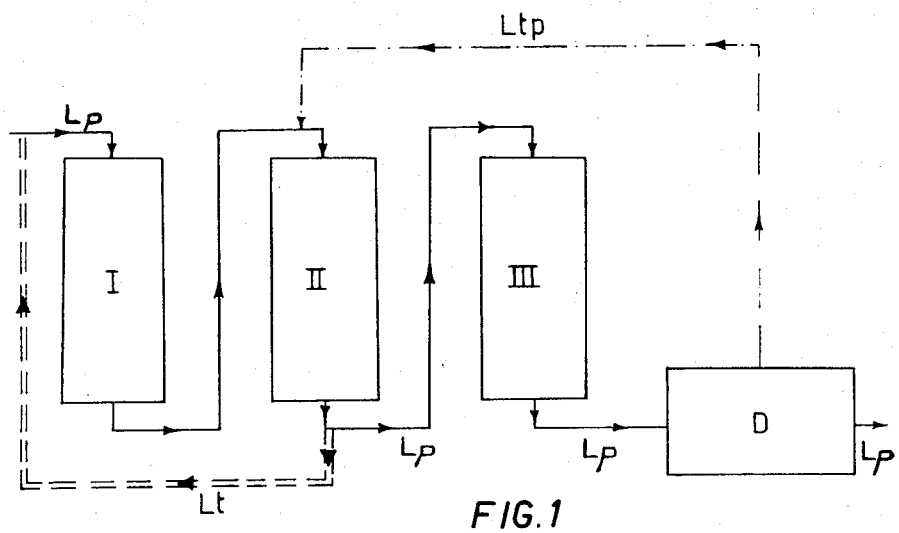
Figure 2:
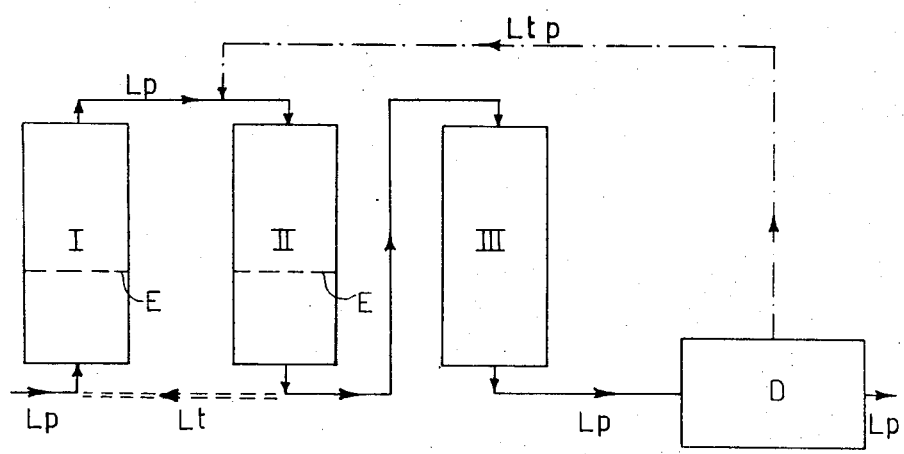
Figure 3:
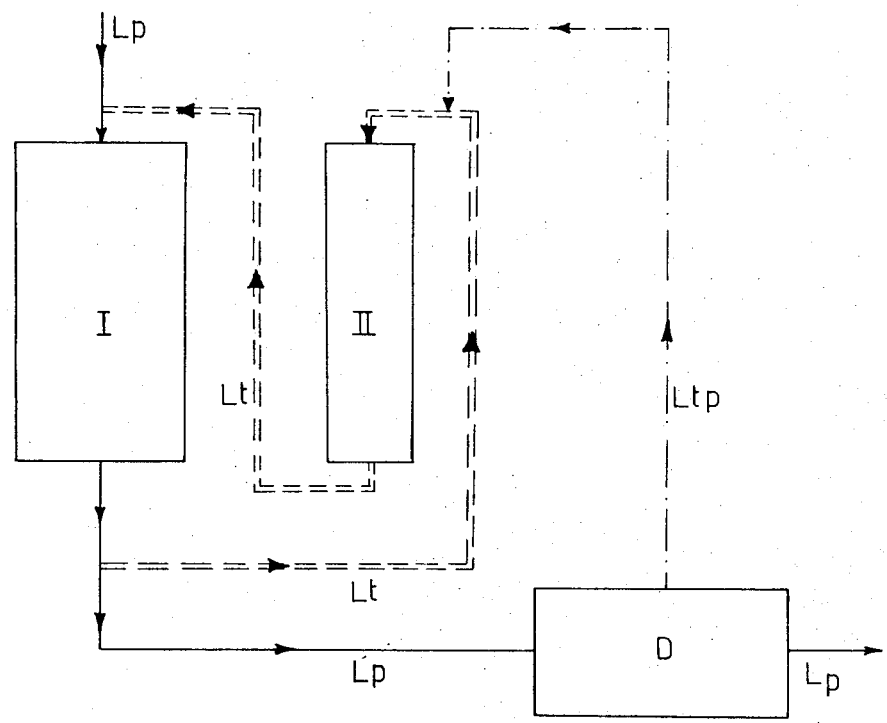

The accompanying drawings show merely by way of example some embodiments of the process according to the present invention; in said drawings:

FIGS. 1 to 3 show respectively the flow diagram of three embodiments of the process of the invention.

The foregoing and other purposes are achieved by a process for the de-ionization of the aqueous saline solutions, which uses essentially weak cation exchangers and weak anion exchangers, which is performed caused the solution to be de-ionized to pass firstly through a cation exchanger constituted of at least one weak cation resin, then through an anion exchanger constituted of at least one anion resin and, thence optionally, through a weak or stronger cation exchanger, wherein, according to the present invention:

(a) A weak anion exchanger is used to fix the anions of strong acids present in the solution effluent from the weak cation exchanger positioned before the weak anion exchanger, owing to the presence of free $CO_2$ in the solution effluent from the aforesaid cation exchanger so as to obtain a solution effluent from said weak anion exchanger which contains an amount of $NaHCO_3$ (or, in any case, of alkali bicarbonate), equivalent to the amount of neutral salts present in the solution to be treated, and (b) A part of the solution effluent from the weak anion exchanger is recycled upstream of the weak cation exchanger into the aqueous saline solution so as to obtain in this latter a methyl orange alkalinity, which is at least equivalent to the total hardness of the solution to be treated so as to enable all the cations of alkaline-earth metals to be fixed on the first weak cation exchanger, while utilizing high exchange capacities of said weak cation exchanger.

In fact it has been unexpectedly found that the presence of a convenable quantity of $CO_2$ in the saline solution which is fed through a weak anion exchanger allows a protonization of the exchange functions of said exchanger with a formation of labile iminio salts which makes the weak anion exchanger according to the present invention capable of fixing the anions of strong acids from a saline solution of neutral salts ($NaCl$, $Na_2SO_4$, $NaNO_3$, etc.) which is caused to pass through said anion exchanger.

Said protonization takes place according to the following equilibrium equation:

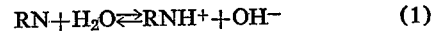
$$RN + H_2O \rightleftharpoons RNH^+ + OH^- \qquad (1)$$

As it is well known, as a solution of a strong acid is percolated through an anion exchange resin bed, the hydrogen ion displaces towards the right the equilibrium, as at (1), from which it turns out that the resin can stably fix the anion.

According to the present invention it is now possible to fix strong anions by feeding neutral saline solutions. This is carried out by mixing with the water fed to the weak anion exchanger a quantity of $CO_2$ sufficient to form a $CO_3^=/HCO_3^-/CO_2$ buffer solution with the alkalinity released by the following exchange reaction:

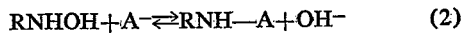
$$RNHOH + A^- \rightleftharpoons RNH-A + OH^- \qquad (2)$$

where A=anion, thus preventing the said alkalinity from displacing the reaction (1) towards the left. This takes place in the case of use of weak anion exchangers even with low concentrations of $OH^-$ ions. This buffer effect must substantially maintain the pH of the solution near to suitable values which must, in any case, be lower than the pH of the weak anion resin, thus enabling the fixing of the anions of strong acids present in the saline solution which percolates through the weak anion exchanger to go on in said exchanger as far as possible in order to utilize the high values of exchange capacity which are typical of said weak anion exchange resin.

Further the poor affinity of the protonate amino resins with respect to the $HCO_3^-$ ion present in the solution allows to nearly exclusively fix the strong anions also in the case where water to be treated has a high salinity degree.

A part of the $CO_2$ which is necessary for ensuring a higher exchange activity of the weak anion exchanger is obtained in the solution to be passed through it by preliminarly percolating said solution through a carboxylic resin exchanger which according to the present invention is positioned before said weak anion exchanger, where the cations corresponding to the bicarbonates of the alkaline earth metals are exchanged with the equivalent H+ ions so that $CO_2$ can evolve.

The further amount of $CO_2$ which could be necessary in order to complete the process can be added to the solution fed into the weak anion exchanger, drawing said $CO_2$ amount from an exterior source, or in a less expensive manner, recycling the $CO_2$ which by a physical process will be previously removed from the de-ionized water effluent from the last cation exchanger in a degasifying unit. A part of the effluent from the weak anion exchanger is recycled into the aqueous solution to be treated upstream of the first weak cation exchanger which is positioned before the weak anion exchanger, said recycle being performed according to the present invention in such a manner as to ensure that the methyl orange alkalinity of the saline solution before entering the first weak cation exchanger is at least equivalent to its content of alkaline-earth cations (hardness). Of course, said recycle has a significance only in the case, wherein the total methyl orange alkalinity is lower than the total hardness of the solution to be treated.

In this manner and according to the present invention all the cations of alkaline-earth metals will be exchanged through the first weak cation exchanger with equivalent H+ ions, thus obtaining in this exchanger high values of the exchange capacity.

The provision of positioning a weak cation exchanger before the weak anion exchanger operating according to the principles of the present invention prevents those inconveniences which can arise in the weak anion exchanger in consequence of the presence of cations of alkaline-earth metals (as, for instance, formation of carbonate or hydrate precipitates) in the solution which percolates therethrough. Therefore said anion exchanger is protected also against iron pollutions (which, if eventually would be present in the solution to be treated, would be retained on the cation exchanger), which could adversely effect the efficiency of said anion exchanger.

Operating according to the present invention, it is possible to reduce effectively those water consumptions which are normally necessary for the regeneration of the exhausted ion exchangers, while the use of weak anion exchangers in the process of the invention permits performing the aforesaid regeneration directly with waters having a high salinity degree, without causing appreciable losses of the exchange capacities.

The foregoing advantages enable to ensure an economical application of the process of the invention to the de-ionization of solutions having a high salinity degree (as, for instance, brackish waters, sugar solutions, solutions containing ionizable and non-ionizable substances, and saline solution in general) by means of ion exchangers; also in the case wherein formerly their utilization was not economically advisable.

The process according to the present invention is particularly suited to perform a total de-ionization of aqueous saline solutions.

Said process can be, in any case, advantageously applied according to a variant of the foregoing embodiment also in order to obtain a total removal from the aqueous saline solutions of the (permanent or temporary) hardness as well as of the mineral and carbonate salinity corresponding to it.

For such a purpose only a part of the effluent from the weak cation exchanger is percolated through the weak anion exchanger (which in this particular embodiment together with the weak cation exchanger form the ion exchange units of a plant for a partial deionization of the saline solution).

According to this variant of the invention, the whole effluent from the weak anion exchanger is recycled upstream of the weak cation exchanger.

The water made free from the hardness and having an alkalinity and salinity reduced in an amount which corresponds to the removed hardness is drawn from the effluent from the weak cation exchanger.

The de-ionization treatment according to this invention could lead only to this result, in the cases where a simple de-ionization is sufficient to ensure the desired characteristics in the de-ionized solution. Provision could also be made that this treatment be used as a first demineralising stage of processes provided to perform the total demineralization of the water, since in this case there is a subsequent conventional total polishing treatment.

The ion exchange synthetic resins to be used as active ion exchange substances in the process according to the present invention can be selected between a wide range of substances of such types and characteristics which are well known to the persons skilled in the art.

Merely by way of example and not as limiting the invention some examples will be hereinafter given of synthetic resins which may advantageously be used in the process of the invention, said resins being those which are formed by co-polymerization of acrylonitrile and methyl acrylate linked with di-vinyl benzene and saponified.

When weak anion resins are used having primary, secondary and tertiary amino groups, very advantageous results have been attained using co-polymers of acrylonitrile and methyl acrylate linked with divinyl benzene and then subjected to an aminolysis with polyamines or with co-polymers of styrene-divinyl benzene chloromethylates and then treated with primary or secondary amines.

There will be now described some preferred examples of methods according to which the process of the invention can be carried into practice.

EXAMPLE A

A total de-ionization of brackish water containing $Ca^{++}$, $Mg^{++}$, $Na^+$, $K^+$, etc. cations and $HCO_3^-$ or other anions as chlorides, sulphates, nitrates, etc. is performed in a series of three ion exchangers constituted of columns including ion exchange resin beds, the plant comprising in series: a weak cation exchanger I of carboxylic type, for instance; a weak anion exchanger II of aminic type, for instance; a weak cation exchanger III similar to the exchanger I; and a degasifier D for physically decarbonating the water which can come from the exchanger III The $CO_2$ recovered in the unit D is utilized again by recycling it upstream of the exchanger II.

In the drawings accompanying the description like reference designate corresponding parts throughout the several figures. In said figures in solid lines (Lp) is indicated the flow of the solution to be de-ionized, in broken lines (Lt) is shown the flow of the recycle solution and in dot and dash lines (Ltp) is shown the flow of the recycle (recovery) $CO_2$.

Now referring to the Example A and to FIG. 1, taking in account that for the purpose of simplifying the description it has been assumed that the salts of alkaline-earth metals present in the water to be de-ionized are NaCl and $CaCl_2$ respectively and that all the cations of the alkaline-earth metals are exchanged in the exchanger I with equivalent H+ ionss in consequence of the recycle, via Lt, and upstream of the exchanger I of a part of the effluent from the exchanger II (so as to obtain a solution feeding the exchanger I having a methyl orange alkalinity which is at least as high as the total hardness of the water to be treated), in the afore-said ion exchangers take place the following reactions:

(1) On the exchanger I takes place the following reactions:

$2RCOOH + Ca^{++} + 2HCO_3^- \rightarrow$

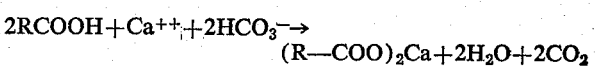

but due to the particular conditions of the recycle, Na+ ion is not fixed in this exchanger.

As a result of this reaction the effluent from the exchanger I contains all the alkaline salts together with a certain amount of $CO_2$ evoluted during the aforesaid reaction.

(2) In the exchanger II takes place the following reaction:

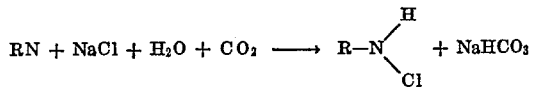

where RN indicates a weak anion resin in the amino form.

Therefore, the effluent from the exchanger II contains exclusively $NaHCO_3$ in an amount which is equivalent to the neutral salts present in the solution fed to the exchanger I and also free $CO_2$ which has not reacted with NaCl and $H_2O$ so as to form $NaHCO_3$. A part of the effluent from the exchanger II is recycled, via $Lt$, upstream of the exchanger I so as to enable this latter to fix the alkaline-earth cations, while the remaining part of said effluent is fed to the exchanger III.

(3) In said exchanger III takes place the following reaction:

$$R{-}COOH + NaHCO_3 \rightarrow R{-}COONa + H_2O + CO_2$$

Therefore the effluent from the exchanger III is constituted of water which exclusively contains $CO_2$ which will be removed by a physical treatment in the decarbonation unit D so as to produce deionized water at the outlet of this unit.

Said weak cation (R—COOH) exchanger III could be substituted with a strong cation exchanger constituted of a sulphonic resin, for instance, so as to minimize or prevent the cation leakage.

Such an arrangement of the ion exchange units enables to obtain de-ionized water with a consumption of regenerating substances lesser than 125% of the amount which stoichiometrically corresponds to the salinity which is totally removed from the treated aqueous solution.

On the contrary, if use is made of a conventional arrangement where are provided a strong cation exchanger and a strong anion exchanger arranged in series and in case wherein the water to be de-ionized is of the same kind, the consumption of regenerating substances would never be lesser than 200% of the stoichiometric value.

Operating according to method of the present invention the consumptions of regenerating media can be brought to values which are substantially equal to the theoretical stoichiometric value in the case where the de-ionization is only partial, but it is however always very high.

The regeneration of the resins contained in the exchangers I and III can be performed by introducing the regenerating medium into the exchanger III and then using the effluent from the exchanger III to regenerate the resin bed of the exchanger I.

When $H_2SO_4$ is used as regenerating medium, the concentrated regenerating solution effluent from the exchanger III is diluted before feeding it to the exchanger I for the purpose of preventing a $CaSO_4$ precipitation therein.

If the exchanger III is constituted of a sulphonic resin it is advisable to carry out the regeneration of said ion exchanger III in countercurrent with respect to the flow of the solution to be de-ionized which passes therethrough in order to improve in a very high amount the characteristics of the produced water and to magnify the efficiency during the regeneration cycle.

The regeneration of the exchanger II is carried out by means of aqueous solutions of $NH_3$ or NaOH or mixtures thereof; in this latter case the two solutions will be added one after the other.

EXAMPLE B

A total de-ionization of an aqueous saline solution having the same characteristics as in the Example A is performed by means of three ion exchangers I, II and III arranged in series in a plant which comprises in the order:

A cation exchanger I which is constituted of a column in the upper part of which is contained an active substance formed of a strong cation resin of sulphonic type, for instance, while in the lower part, which is divided from the upper one by an element E formed by a partition not made of plastics or the like and mounted between two perforated plates made of stainless steel, is placed an active substance constituted of a weak cation resin of carboxylic type, for instance.

The two cation exchange resin beds are fed by a flow of the aqueous solution to be de-ionized which travels through them moving from the bottom towards the top, while the regeneration is carried out by means of a regenerating flow moving from the top towards the bottom.

When $H_2SO_4$ is used as regenerating medium for regenerating the resin bed of the exchanger I, a dilution of the regenerating solution with water is effected at the height of the partition E of said two cation exchange resin beds.

The anion exchanger II is constituted of a column which includes one or more beds of anion resins, said beds being divided from each other by elements E, each constituted of a partition net of plastics arranged between two perforated plates of stainless steel, the active substances of the beds being constituted of anion resins having a basicity degree which increases from one bed to the other viewing in the direction of the flow of the solution to be de-ionized.

The anion exchanger II is fed, via $Lp$, by a flow of aqueous solution coming out from the top of the exchanger I, said solution moving from the top towards the bottom in the exchanger II, while the regeneration of this latter is performed by causing the flow of regenerating medium to pass from the bottom to the top of it.

The cation exchanger III is constituted of a column including a weak cation exchange resin of carboxylic type, for instance, or a strong cation resin of sulphonic type, for instance. At D is indicated the degasifying unit for a physical decarbonation of the water effluent from the exchanger III. $CO_2$ recovered in the unit D is utilized recycling it, via $Ltp$, upstream of the exchanger II (FIG. 2).

The reactions which take place in each exchanger provided in the plant of the Example B are the following:

(1) In the lower part of the exchanger I, where (R—COOH) is used as active substance, the reaction is the following:

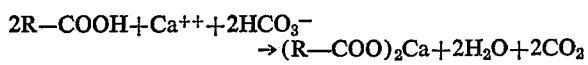

while in the upper part, where $RSO_3H$ is used active substance, the reaction is:

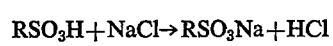

This reaction normally involves only a part of the NaCl present in the water to be de-ionized.

In consequence of the two aforesaid reactions the effluent $Lp$ from the exchanger I contains $CO_2$, free acids (HCl) corresponding to the neutral salts present in the solution to be treated and also a certain amount of NaCl (or other neutral salts present in the starting solution).

The amount of NaCl (or other neutral salts) which has not been retained by the strong cation resin bed ($RSO_3H$) corresponds with the admitted cation leakage and is a consequence of the low levels of regeneration which are provided on the purpose of attaining the highest regeneration efficiency of said cation exchanger.

Said leakage of neutral salts is necessary in order to obtain in the effluent from the anion exchanger II the alkalinity which is required to allow the recycle of the solution which enables to fix all the cations of alkaline-earth metals in the weak cation resin bed of the exchanger I, where R—COOH is used as active substance.

(2) In this anion exchanger II take place the following reactions:

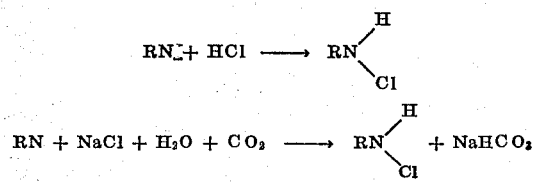

Therefore the effluent from the exchanger II exclusively contains non-reacted $CO_2$ and $NaHCO_3$ in an amount which is equivalent to the cation leakage admitted in the exchanger I.

Part of this effluent is recycled, via $Lt$, upstream of the exchanger I so as to perform the fixing of the alkaline-earth cations in the lower part of this latter, while the remaining part of it is fed to the cation exchanger III.

The necessity of adding $CO_2$ or not, via $Ltp$ (fed from an exterior source or by a recovery source) to the solution incoming into the exchanger II depends upon the hardness of the solution to be treated, upon the amount of the cation leakage admitted in the exchanger I and also upon the desired de-ionization degree with respect to the neutral salts present in the solution to be treated.

Further when a multilayer anion bed is provided which comprises suitable resins having different basicity degree, it is possible to regenerate by hydrolysis the resins having low basicity by simply causing water to percolate through the anion resin bed.

The amount of the removed acidity is a function of the pH of the utilized resins and of the exhaustion degree attained in the preceding exhaustion phase and also of the eventual alkalinity content of the raw feed water. Operating in a convenient manner, it is possible to use the acidity set free during the hydrolysis phase for regenerating the weak cation exchange resins, i.e. water is continuously recycled through said cation resin beds.

As the operation is carried out according to the diagram flow shown in FIG. 2, where provision is made that exchanger I includes two cation exchange resin beds formed by suitable amounts of cation resins having a different acidity degree, it is also possible to obtain a cation effluent from the exchanger I having a high content of free mineral acidity enabling to attain a higher exhaustion degree of the resins in the exchanger II having a low basicity and accordingly a high exchange capacity of said resins as well as a higher regeneration action on them performed by hydrolysis.

(3) In the exchanger III takes place the following reaction:

$$RCOOH + NaCO_3 \rightarrow RCOONa + H_2O + CO_2$$

As a consequence at the outlet of this exchanger III there is water which exclusively contains $CO_2$ which may be removed by physical means in the decarbonating unit D, from which comes out de-ionized water.

The regeneration of the resin bed of the exchanger II is carried out as stated in the Example A; or it could also be carried out countercurrently by using lime; or could be also performed by providing a preliminary regeneration of the resins by hydrolysis. If partially decationized water containing 30 p.p.m. of free mineral acidity is caused to pass through anion resins and the operation is carried out as it has hereinabove been stated, a pre-regeneration by hydrolysis is performed exceeding the 25% with a contemporaneous increasing of the exchange capacity of the anion exchange resin which exceeds 20% with regard to that which can be obtained operating according to the method of Example A and of FIG. 1. In a similar manner the regeneration of the cation exchanger III can be performed as disclosed in the foregoing Example A or it may be accomplished by connecting in series the exchangers II and III and/or I and recycling raw water.

Such an arrangement of the ion exchange units allows to obtain de-ionized water with a consumption of regenerating agents lesser than 100% of the stoichiometric amount corresponding to the salinity which will be partially or totally removed from the treated aqueous solution.

If it is desired to effect an only partial de-ionization the exchanger III, which has been provided in the Example B, is no more necessary and can be also useless any feeding of $CO_2$ into the solution conveyed in the pipe connecting the exchangers I and II.

EXAMPLE C

A partial de-ionization of an aqueous solution having the same characteristics as in the Example A, with a total removal of the hardness and of the salinity corresponding to it, is performed in a plant according to FIG. 3 and which comprises, arranged in series:

A weak cation exchanger I of carboxylic type, for instance; a weak anion exchanger II of amino type, for instance; and a degasifying unit D for the decarbonation of the water effluent from the cation exchanger I, using physical means. The $CO_2$ recovered in the unit D is recycled, via $Ltp$, upstream of the exchanger II.

In the embodiment of FIG. 3 the exchanger I is still constituted of a column where there is a weak cation resin bed of R—COOH type. Only a part of the effluent from the exchanger I is passed through the exchanger II and the effluent from the exchanger II is wholly recycled up-stream of the exchanger I, being previously mixed with the raw solution fed to the exchanger I so as to produce a solution entering the exchanger I which has a methyl orange alkalinity at least equal to the total hardness of the solution to be treated.

The reactions which take place in said two ion exchangers are the following:

(1) On the exchanger I takes place the following reaction:

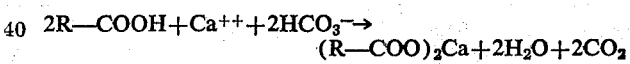

in consequence of this reaction the effluent from the exchanger I contains all the neutral salts as well as the $CO_2$ obtained during said reaction.

(2) In the exchanger II takes place the following reaction:

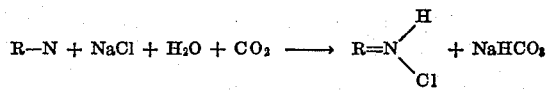

As a result of this latter reaction the effluent from the ion exchanger II contains free (non-reacted) $CO_2$ and $NaHCO_3$ in an amount equivalent to the neutral salts present in the solution influent in the ion exchanger I.

The whole effluent from the anion exchanger II is recycled, via $Lt$, upstream of the cation exchanger I so as to allow all the cations of the alkaline earth metals to be fixed therein, which are present in the solution to be treated.

When operating according to the afore-described method in a plant, as shown in FIG. 3, it is possible to obtain the total removal from the treated solution of the (temporary or permanent) hardness and of the (carbonate or mineral) salinity equivalent to it.

This operating method can be used as a preliminary treatment for brackish waters to be desalined by an electrodialysis process or by other desalination processes.

Said method enables therefore to feed the desalination plants with water free from hardness and alkalinity and having a salinity degree less than that of the raw brackish water, since owing to the process of the present invention it is possible to perform a removal and not a simple substitution of the cations relative to the hardness of said water.

We claim:

1. A process for the de-ionization of aqueous saline solutions containing alkalinity and hardness ions, wherein the total methyl orange alkalinity is lower than the total hardness of the solution to be treated, comprising: passing the aqueous solution to be de-ionized successively through a substantially weak acid first cation exchanger in the hydrogen form, passing the solution effluent from said cation exchanger through a weak base anion exchanger in the free base form and recycling a part of the solution effluent from said anion exchanger into the aqueous solution entering said cation exchanger in an amount so as to produce a solution entering said cation exchanger which has a methyl orange alkalinity equal approximately to the total hardness of the solution to be treated.

2. A process as defined by claim 1, further including the step of passing the remainder of the solution effluent from said anion exchanger through a second cation exchanger.

3. A process as defined by claim 2, further including the step of decarbonating the solution effluent from said second cation exchanger and recycling the recovered $CO_2$ into the solution effluent from said first cation exchanger prior to its passing through said anion exchanger.

References Cited

UNITED STATES PATENTS

| | | |
|---|---|---|
| 3,438,891 | 4/1969 | Schmidt et al. _____ 210—34 X |
| 3,423,311 | 1/1969 | Hetherington et al. ___ 210—38 |
| 3,420,773 | 1/1969 | Selmeczi _____ 210—37 X |
| 3,458,438 | 7/1969 | Smith et al. _____ 210—37 X |
| 3,382,169 | 5/1968 | Thompson _____ 210—38 X |
| 3,156,644 | 11/1964 | Kunin _____ 210—37 X |

REUBEN FRIEDMAN, Primary Examiner

T. G. WYSE, Assistant Examiner

U.S. Cl. X.R.

210—32, 37, 38